United States Patent
Reyes et al.

(10) Patent No.: US 7,448,085 B1
(45) Date of Patent: Nov. 4, 2008

(54) METHOD AND APPARATUS FOR DETECTING MALICIOUS CONTENT IN PROTECTED ARCHIVES

(75) Inventors: Crescencio F. Reyes, Pasay (PH); Ed Israel S. Malibiran, Las Pinas (PH); Ronald C. Bautista, Quezon City (PH)

(73) Assignee: Trend Micro Incorporated, Tokyo (JP)

( * ) Notice: Subject to any disclaimer, the term of this patent is extended or adjusted under 35 U.S.C. 154(b) by 601 days.

(21) Appl. No.: 10/885,997

(22) Filed: Jul. 7, 2004

(51) Int. Cl.
*G06F 11/00* (2006.01)
*G06F 7/04* (2006.01)
*G06F 1/00* (2006.01)
*G06K 17/00* (2006.01)
*H04L 29/06* (2006.01)
*B65C 9/14* (2006.01)
*B65C 9/36* (2006.01)

(52) U.S. Cl. .............................. 726/26; 726/22; 726/24

(58) Field of Classification Search .................... 726/26, 726/22, 24
See application file for complete search history.

(56) References Cited

U.S. PATENT DOCUMENTS

| 5,442,699 | A | 8/1995 | Arnold et al. |
| 5,452,442 | A | 9/1995 | Kephart |
| 5,907,834 | A | 5/1999 | Kephart et al. |
| 6,192,512 | B1 | 2/2001 | Chess |
| 6,279,128 | B1 | 8/2001 | Arnold et al. |
| 6,622,134 | B1 | 9/2003 | Sorkin |
| 6,711,583 | B2 | 3/2004 | Chess et al. |
| 6,789,200 | B1 | 9/2004 | Fiveash et al. |
| 6,813,712 | B1 | 11/2004 | Luke |
| 7,043,634 | B2 * | 5/2006 | Wolff et al. ................. 713/165 |
| 2004/0260636 | A1 * | 12/2004 | Marceau et al. ............... 705/35 |
| 2006/0053180 | A1 * | 3/2006 | Alon et al. .................. 707/204 |

FOREIGN PATENT DOCUMENTS

| EP | 1 377 892 B1 | 9/2004 |
| WO | WO 02/084459 A1 | 10/2002 |
| WO | WO 2005047862 A2 * | 5/2005 |

OTHER PUBLICATIONS

Mark W. Storer, Kevin Greenan, Ethan L. Miller, "Long-term Threats to Secure Archives", Oct. 2006, StorageSS '06: Proceedings of the second ACM workshop on Storage security and survivability, pp. 9-15.*

* cited by examiner

*Primary Examiner*—Matthew Smithers
*Assistant Examiner*—Courtney D Fields
(74) *Attorney, Agent, or Firm*—Okamoto & Benedicto LLP

(57) ABSTRACT

In one embodiment, a protected archive is checked for malicious content by checking a file size of the archive and/or examining the archive for notable characteristics indicative of malicious content. The notable characteristics may include values in a header of the archive. For example, the file name extension of a file contained in the archive and the compression method used to create the archive may be taken into account in determining whether the archive has malicious content, such as a worm or a virus. Embodiments of the present invention allow for detection of malicious content in the protected archive without necessarily having to extract files from the archive.

20 Claims, 5 Drawing Sheets

METHOD AND APPARATUS FOR DETECTING MALICIOUS CONTENT IN PROTECTED ARCHIVES

BACKGROUND OF THE INVENTION

1. Field of the Invention

The present invention relates generally to computer systems, and more particularly but not exclusively to techniques for detecting malicious content.

2. Description of the Background Art

Malicious programs, such as computer viruses, spy wares, worms, and Trojans, pose a significant threat to computer systems. For example, a computer virus can corrupt or delete important files, send e-mails without user authorization, render a computer inoperable, or cause other types of damage to a computer. Computers may incorporate antivirus programs as a protective measure against viruses. An antivirus program may open a file and then scan the file for malicious content.

As a countermeasure against antivirus programs, a malicious program may be embedded in a password protected archive. An example of such a malicious program is the so-called "BAGLE" worm. The BAGLE worm propagates by mass-mailing copies of itself using SMTP (Simple Mail Transfer Protocol). The BAGLE worm also opens a backdoor that allows a hacker to upload and run programs on infected computers.

The BAGLE worm arrives in a password protected archive, which is included as an attachment to an e-mail. The password required to extract files from the archive is included in the message body of the e-mail. The password is provided as a text file in the early versions of the worm. This allows an antivirus program to parse the message body to obtain the password, which in turn allows the antivirus program to extract files from the archive for scanning. However, later versions of the worm include the password as a graphical image. This prevents an antivirus program from obtaining the password needed to extract files from the archive.

SUMMARY

In one embodiment, a protected archive is checked for malicious content by checking a file size of the archive and/or examining the archive for notable characteristics indicative of malicious content. The notable characteristics may include values in a header of the archive. For example, the file name extension of a file contained in the archive and the compression method used to create the archive may be taken into account in determining whether the archive has malicious content, such as a worm or a virus. The archive may be inspected at a server computer prior to the archive being provided to a user at a client computer. The notable characteristics may be included in a pattern file of an antivirus program to facilitate updates when new notable characteristics of malicious programs are discovered. Embodiments of the present invention allow for detection of malicious content in the protected archive without necessarily having to extract files from the archive.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Embodiments of the invention are described herein using e-mails and archived files as examples. It should be understood, however, that the invention is not so limited and may be generally employed in applications requiring detection of malicious content in protected data.

Figure 1:
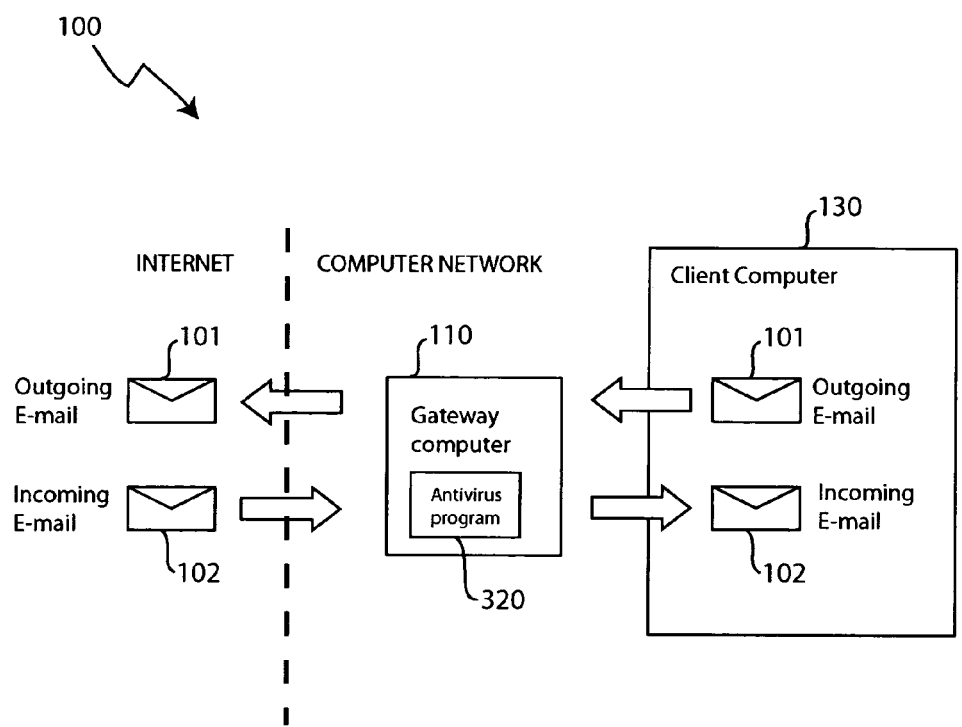
FIG. 1 schematically illustrates a computing environment in accordance with an embodiment of the present invention.

FIG. 1 schematically illustrates a computing environment 100 in accordance with an embodiment of the present invention. In the example of FIG. 1, computing environment 100 includes a client computer 130 located in a computer network along with a gateway computer 110. The client computer 130 may communicate with other computers on the Internet by way of the gateway computer 110. Other network nodes, such as routers, firewalls, e-mail servers, and other computers, are not shown for clarity of illustration. In the example of FIG. 1, client computer 130 sends and receives e-mails over the Internet.

In one embodiment, an antivirus program 320 is installed and running in a server computer, such as the gateway computer 110. This advantageously allows the antivirus program 320 to scan data for malicious content before the data is received in the client computer 130 or other computers in the network. Running the antivirus program 320 at a server computer also simplifies maintenance because the network administrator has only one (or a few) central location where antivirus program updates need to be performed.

The antivirus program 320 may be configured to check an incoming e-mail 102 or outgoing e-mail 101 for malicious content. For example, the antivirus program 320 may be configured to check an incoming e-mail 102 at the gateway computer 110 before the incoming e-mail 102 is received by a user at the client computer 130. In other embodiments, the antivirus program 320 is installed and running in the client computer 130. In that embodiment, the antivirus program 320 checks an incoming e-mail 102 before e-mail 102 is presented to the user, or an outgoing e-mail 101 before e-mail 101 is transmitted out of client computer 130.

Figure 2:
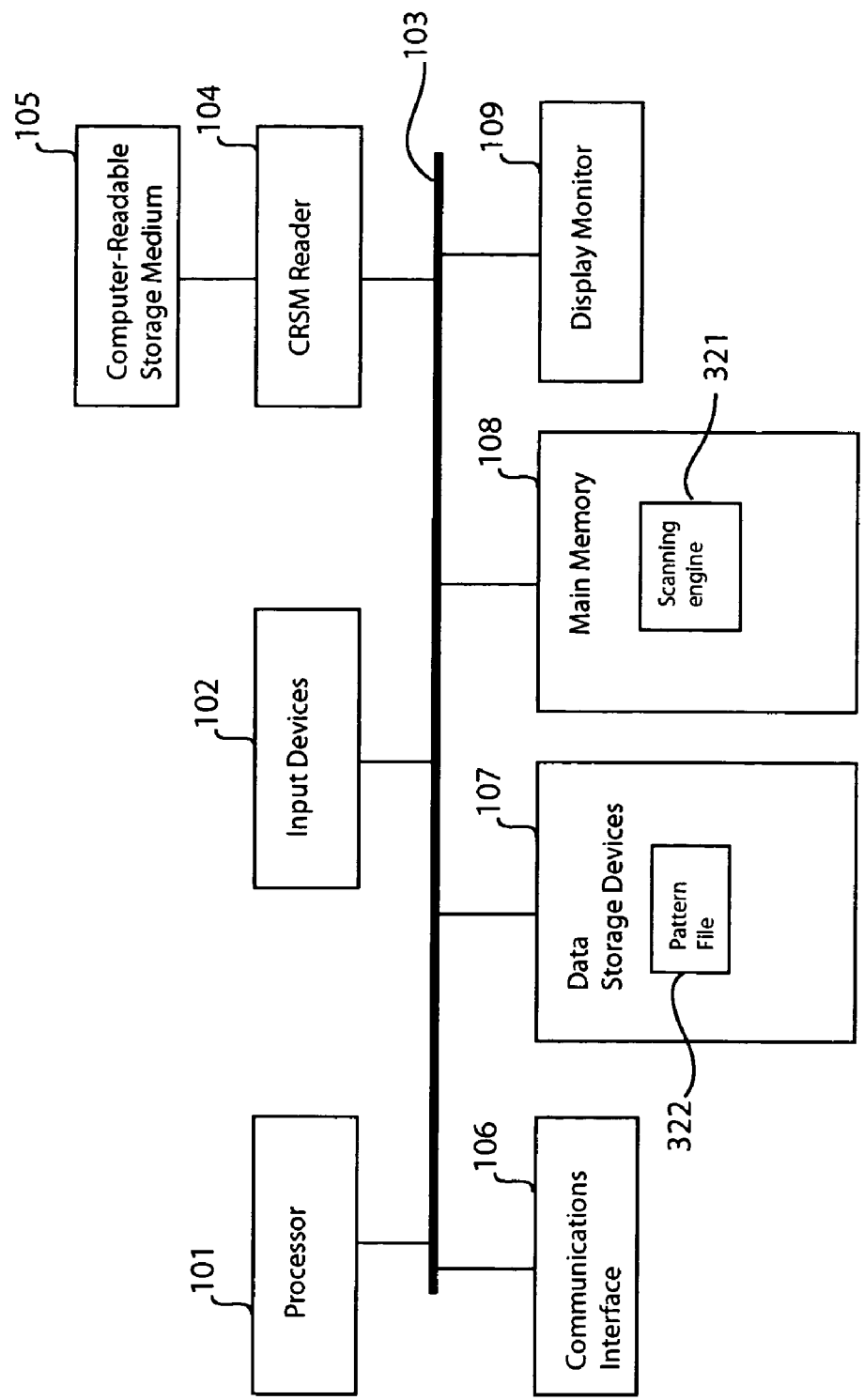
FIG. 2 shows a schematic diagram of an example computer that may be used in embodiments of the present invention.

Referring now to FIG. 2, there is shown a schematic diagram of an example computer that may be used in embodiments of the present invention. Depending on its configuration, the computer shown in the example of FIG. 2 may be employed as a gateway computer or a client computer. The computer of FIG. 2 may have less or more components to meet the needs of a particular application. As shown in FIG. 2, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108.

In the example of FIG. 2, the computer is configured as a gateway computer 110 having an antivirus program 320 comprising a scanning engine 321 and a pattern file 322. The pattern file 322 is depicted as being stored in a data storage device 107, while the scanning engine 321 is depicted as being in the memory 108. Note, however, that the scanning engine 321 may have a corresponding executable file in the data storage 107. Similarly, the contents of the pattern file 322 may be read from the data storage 107 to the memory 108. The scanning engine 321 may comprise computer-readable program code for detecting and removing malicious programs, such as computer viruses and worms, for example. The scanning engine 321 works in conjunction with the pattern file 322, which may contain the patterns and notable characteristics of known malicious programs, and instructions or algorithms for dealing with them. The pattern file 322 may be updated to include information on newly discovered malicious programs. It is to be noted that the mechanics of scanning data for malicious programs and removing detected malicious programs, in general, is known in the art and not further described here.

Figure 3A:
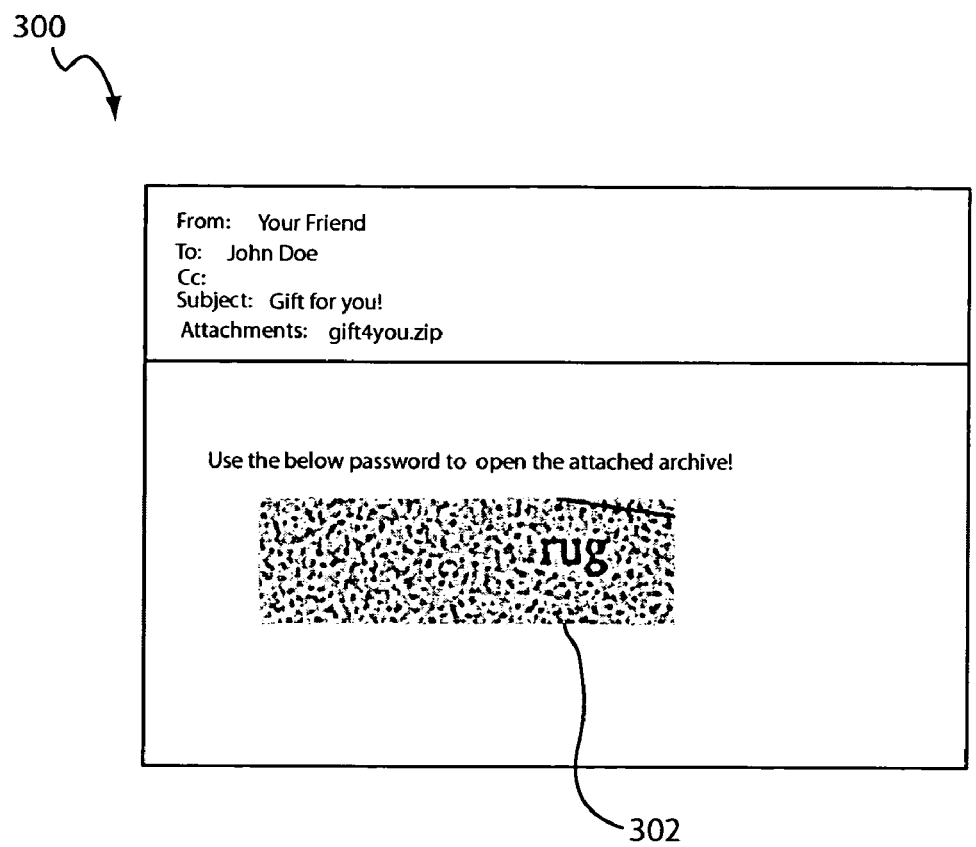
FIG. 3A schematically shows an example e-mail containing an attached archive generated by a malicious program.

FIG. 3A schematically shows an example e-mail 300 containing an attached archive generated by a malicious program. A malicious program-generated archive is also referred to herein as a "bad archive." In the example of FIG. 2, the bad archive "gift4you.zip" is in the zip format. Note that a bad archive may also be in other archive formats, such as the so-called RAR format. An archive contains one or more archived files. An archive may be protected with a password to prevent the archived file from being extracted by other than the intended receiver. A password protected archive asks for the password before allowing extraction of files contained therein. In the example of FIG. 3A, the password for the attached bad archive is provided as a graphical image 302. Although the password displayed by the graphical image 302 is human-readable, the password is otherwise unreadable to a computer program. More specifically, the antivirus program 320 cannot parse the graphical image 302 to get the password (which is "rug" in the example of FIG. 3A). This prevents the antivirus program 320 from extracting and scanning the file contained in the bad archive. Only the user can extract files from the archive by manually entering the password.

Figure 3B:
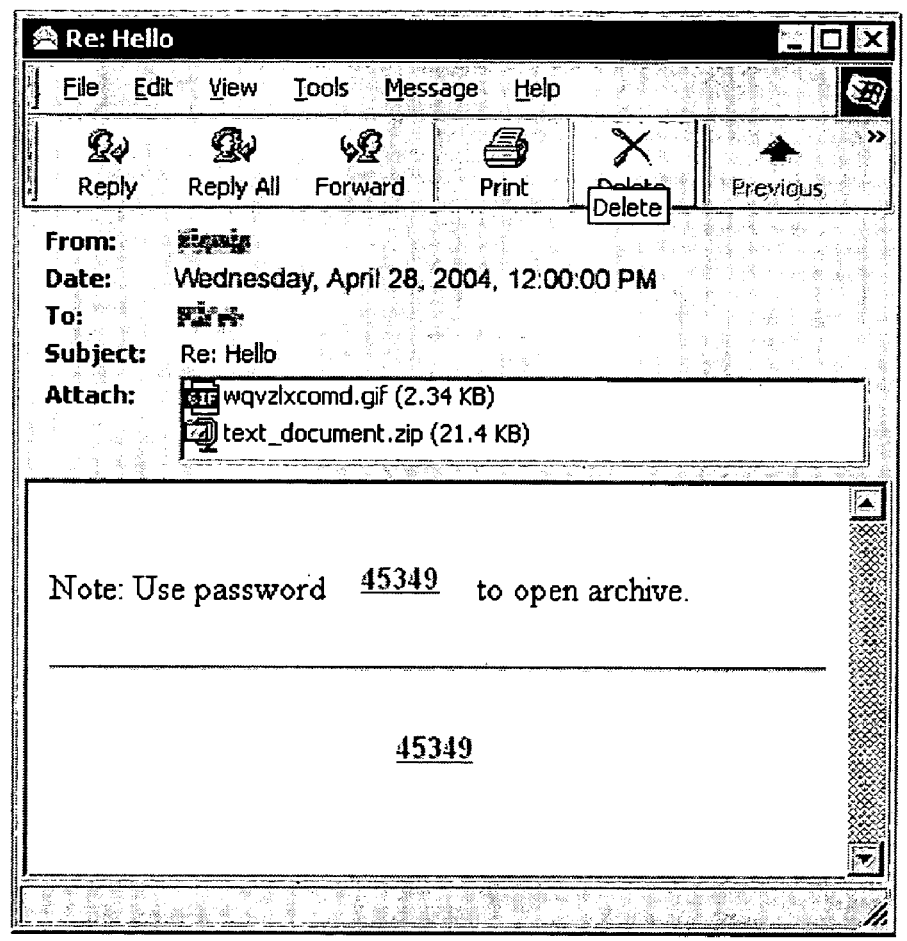
FIG. 3B shows a screenshot of an example e-mail generated by the so-called "BAGLE" worm.

FIG. 3B shows a screenshot of an example e-mail 310 generated by the BAGLE worm. In the example of FIG. 3B, the password "45349" for opening the attached bad archive "text_document.zip" is in the "gif" format. Typical antivirus programs cannot read a gif image, and thus will not be able to extract files from the bad archive.

In one embodiment, a signature based detection technique is used to determine if a protected archive contains malicious content. The signature based detection technique advantageously does not require file extraction, and may thus be used even if the archive cannot be opened by an antivirus program. The signature based detection technique may rely on notable characteristics of known bad archives. Antivirus researchers may observe the notable characteristics of bad archives, and incorporate those characteristics as filters in pattern files employed by antivirus programs. In one embodiment, the notable characteristics indicative of a bad archive include file size, and certain values in file headers, such as the compression method used, whether the archive is password protected, and name of files contained in the archive. Note that the header of a typical archive is readable without having to open the archive. In other words, the header of an archive is normally available for inspection even if the archive is protected.

Figure 4:
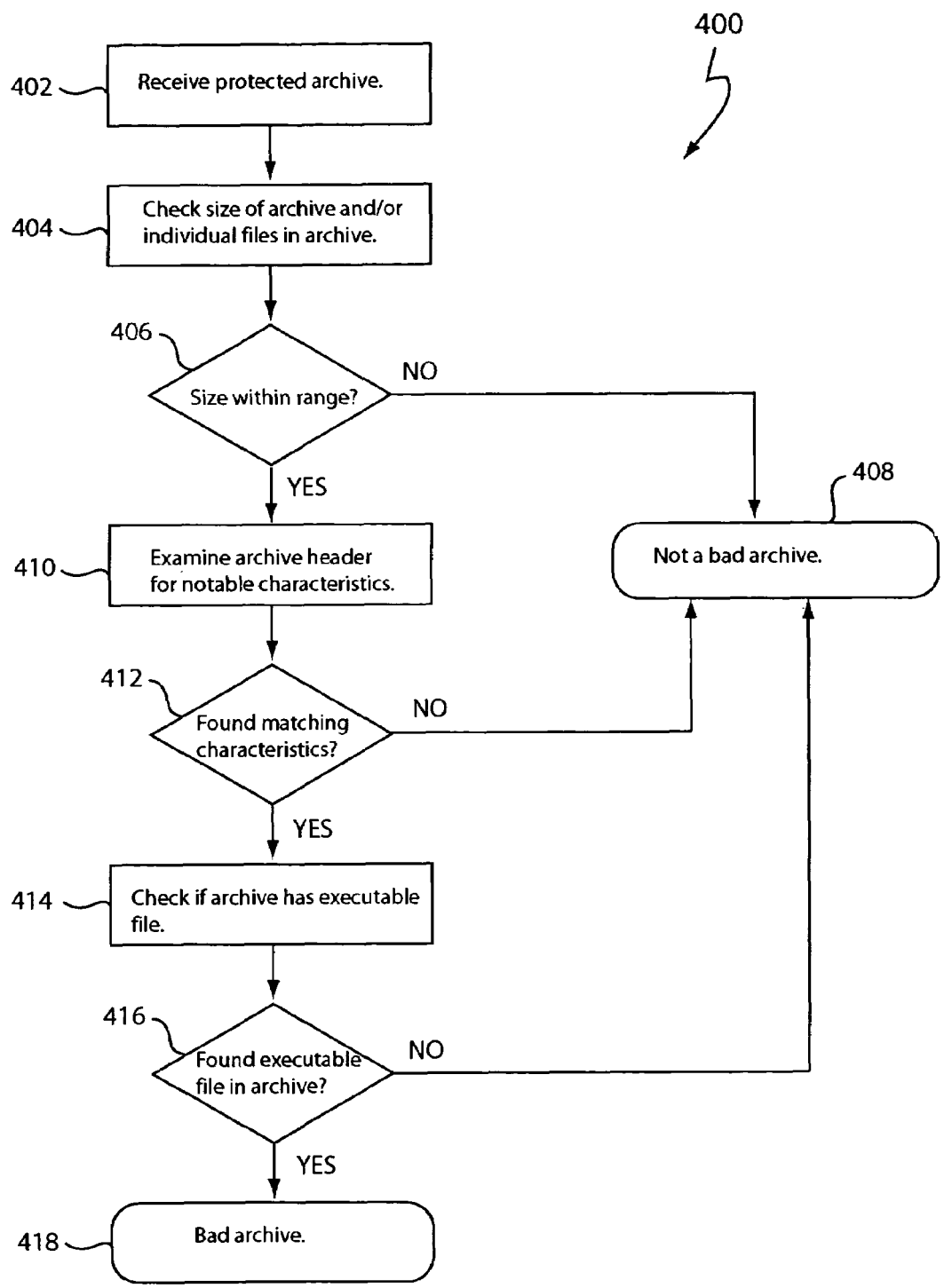
FIG. 4 shows a method of detecting malicious content in a protected archive, in accordance with an embodiment of the present invention.

FIG. 4 shows a method 400 of detecting malicious content in a protected archive, in accordance with an embodiment of the present invention. In the example of FIG. 4, the malicious content is a virus or a worm. However, the malicious content may also be other unwanted content, such as spam (i.e., unsolicited e-mail) or unauthorized communication. The method 400 may be implemented as part of the antivirus program 320. For example, the notable characteristics of bad archives may be included in the pattern file 322 (see FIG. 2). The scanning engine 321 may then consult the pattern file 322 to find out what to look for in determining whether an archive was generated by a malicious program. Including the notable characteristics of bad archives in a pattern file advantageously facilitates updating of notable characteristics as researchers learn more about the malicious program. The notable characteristics of bad archives may also be incorporated in a scanning engine or other components of an antivirus program. Depending on the application, the method 400 may also be implemented in hardware (e.g., ASIC).

Beginning in step 402, a protected archive is received in a computer. The computer may be a server computer or a client computer, for example. The archive may contain one or more files and be protected with a password. For example, the archive may be a password protected zip or RAR file. The protected archive may be configured to prevent extraction of archived files except manually by a user at a client computer, for example.

In step 404, the scanning engine 321 checks the size of the archive, individual files in the archive, or both. For example, the header of a zip archive contains a local file header for each archived file. The local file header may be examined to determine the compressed, uncompressed, or both sizes of an archived file. The size of the entire archive may also be taken into account.

In step 406, the scanning engine 321 compares the size of the archive, individual files in the archive, or both to those of known bad archives. The file sizes for known bad archives may be included in the pattern file 322. If the size of the archive or any file in the archive is within range of those known to be associated with a malicious program, method 400 continues to step 410. Otherwise, the archive may be assumed to be a good (i.e., not bad) archive, as indicated in step 408.

For example, assuming that an archived file in a BAGLE worm-generated archive is known to have a compressed size of 44 KB to 46. KB and the received archive has a single archived file having a compressed size of 50 KB, it may be assumed that the received archive was not generated by the BAGLE worm. Otherwise, additional filtering steps may be needed to minimize the number of false positives (i.e., false alarms).

In step 410, the scanning engine 321 examines the header of the received archive for notable characteristics. Such notable characteristics may include the compression method used and other values in the header of the archive. For example, in some bad archives using the zip format, the compression method (offset 0x8 in the local file header) used is 0x0, and the difference between the compressed size (offset 0x12 in the local file header) and the uncompressed size (offset 0x16 in the local file header) is 0xC. The just mentioned header values may be included in the pattern file 322 for use by the scanning engine 321 in determining whether a zip archive is likely to be a bad archive. Note that the header of a zip archive includes a central directory in addition to local file headers. Only the values in the local file headers may be examined and taken into account for performance reasons. Values in the central directory may also be examined and taken into account to minimize false positives.

In the path from step 412 to step 408, the received archive may be assumed to be a good archive if its header does not have a value matching that of known bad archives. Otherwise, method 400 continues in step 414.

In step 414, the scanning engine 321 checks the received archive for executable files. Step 414 may be performed by examining the file name extensions of files in the archive. For example, in the Microsoft Windows™ operating system environment, files with file name extensions of ".exe", ".scr", and ".pif" are executable files and are likely to harm the computer if the received archive turns out to be a bad archive. In some archives (e.g., zip), the file name extensions of archived files may be determined by examining the header of the archive.

In the path from step 416 to step 408, the received archive may be assumed to be a good archive if it does not contain executable files. Otherwise, as indicated in step 418, the received archive may be assumed to be a bad archive.

In the example of FIG. 4, method 400 uses a series of filters that include file size (step 404), header values (step 410), and executable files in the archive (step 416) in determining whether or not an archive is a bad archive, without having to extract files from the archive. These filters are designed to minimize the number of false positives without substantially impacting performance. In light of the present disclosure, those of ordinary skill in the art will appreciate that more or less filters may be employed to accommodate the requirement of particular applications.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed by a server computer, the method comprising:

receiving a protected archive in the server computer, the protected archive including an archived file, the protected archive being configured to prevent extraction of the archived file except manually by a user at a client computer; and examining the protected archive for notable characteristics indicative of an archive that has been generated by a malicious program.

2. The method of claim 1 wherein the protected archive comprises a zip file.

3. The method of claim 1 wherein the protected archive is password protected.

4. The method of claim 1 wherein the archived file comprises a worm or a virus.

5. The method of claim 1 wherein the notable characteristics include the size of the protected archive.

6. The method of claim 5 wherein the notable characteristics include a value in a header of the protected archive.

7. The method of claim 6 wherein the notable characteristics include a file name extension of the archived file.

8. The method of claim 1 wherein the notable characteristics include a value in a header of the protected archive.

9. The method of claim 8 wherein the value is indicative of a compression method used to archive the archived file.

10. The method of claim 1 wherein examining the protected archive comprises:

(a) checking a file size of the protected archive;

(b) checking for particular values in a header of the protected archive after step (a); and (c) checking if the archived file is an executable file after step (b).

11. The method of claim 10 wherein the file size is a size of the entirety of the protected archive.

12. The method of claim 10 wherein the file size is a size of the archived file.

13. A computer having a processor for executing computer-readable program code in a memory, the memory comprising:

computer-readable program code for checking a file size of a protected archive containing an archived file, the protected archive being protected by a password;

computer-readable program code for checking a value in a header of the protected archive;

computer-readable program code for determining if the archived file comprises an executable file; and computer-readable program code for determining if the protected archive includes a virus based on the file size of the protected archive, the value in the header of the protected archive, and whether the archived file comprises an executable file.

14. The computer of claim 13 wherein the computer comprises a server computer.

15. The computer of claim 13 wherein the computer further comprises a pattern file comprising information on notable characteristics of protected archives created by malicious programs.

16. A method to be performed by a computer, the method comprising:

receiving an e-mail in the computer, the e-mail including a protected archive;

checking a header of the archive to determine if the archive is likely to contain malicious content without extracting an archived file in the archive.

17. The method of claim 16 further comprising:
checking a file size of the archive to determine if the archive is likely to contain malicious content.

18. The method of claim 16 further comprising:
checking for an executable file in the archive to determine if the archive is likely to contain malicious content.

19. The method of claim 16 wherein the computer comprises a server computer coupled to a client computer destined to receive the e-mail.

20. The method of claim 16 wherein the password is provided in the e-mail in graphical form.

* * * * *

US 7,448,085 C1

EX PARTE REEXAMINATION CERTIFICATE (8319th)

United States Patent
Reyes et al.

(10) Number: US 7,448,085 C1
(45) Certificate Issued: Jun. 7, 2011

(54) METHOD AND APPARATUS FOR DETECTING MALICIOUS CONTENT IN PROTECTED ARCHIVES

(75) Inventors: Crescencio F. Reyes, Pasay (PH); Ed Israel S. Malibiran, Las Pinas (PH); Ronald C. Bautista, Quezon (PH)

(73) Assignee: Trend Micro Incorporated, Shibuya-Ku, Tokyo (JP)

Reexamination Request:
No. 90/010,863, Feb. 13, 2010

Reexamination Certificate for:
Patent No.: 7,448,085
Issued: Nov. 4, 2008
Appl. No.: 10/885,997
Filed: Jul. 7, 2004

(51) Int. Cl.
*G06F 11/00* (2006.01)
*G06F 7/04* (2006.01)
*G06F 1/00* (2006.01)
*B65C 9/14* (2006.01)
*B65C 9/36* (2006.01)
*G06K 17/00* (2006.01)
*H04L 29/06* (2006.01)

(52) U.S. Cl. .............................. 726/26; 726/22; 726/24
(58) Field of Classification Search .................... 726/24
See application file for complete search history.

(56) References Cited

U.S. PATENT DOCUMENTS

| 5,442,699 A | 8/1995 | Arnold et al. | |
| 7,290,282 B1 * | 10/2007 | Renert et al. | 726/24 |
| 7,302,706 B1 * | 11/2007 | Hicks et al. | 726/24 |

OTHER PUBLICATIONS

"Infectable Objects Part Four—Viruses Files and Compressed Files", by Robert Vibert, Jan. 10, 2001.
"Advanced Virus Detection Scan Engine and DATs", Copyright 2002, Network Associates Executive White Paper.
"McAfee VirusScan Security Suite", Copyright 2001, McAfee / Network Associates.
"F–Secure Virus Descriptions", Selection of Virus Alerts published by F–Secure, Inc. 2001–2003.
"How to Trick Anti–Virus Systems", Dec. 24, 2003, GovernmentSecurity.org.

* cited by examiner

*Primary Examiner* — Minh Dieu Nguyen

(57) ABSTRACT

In one embodiment, a protected archive is checked for malicious content by checking a file size of the archive and/or examining the archive for notable characteristics indicative of malicious content. The notable characteristics may include values in a header of the archive. For example, the file name extension of a file contained in the archive and the compression method used to create the archive may be taken into account in determining whether the archive has malicious content, such as a worm or a virus. Embodiments of the present invention allow for detection of malicious content in the protected archive without necessarily having to extract files from the archive.

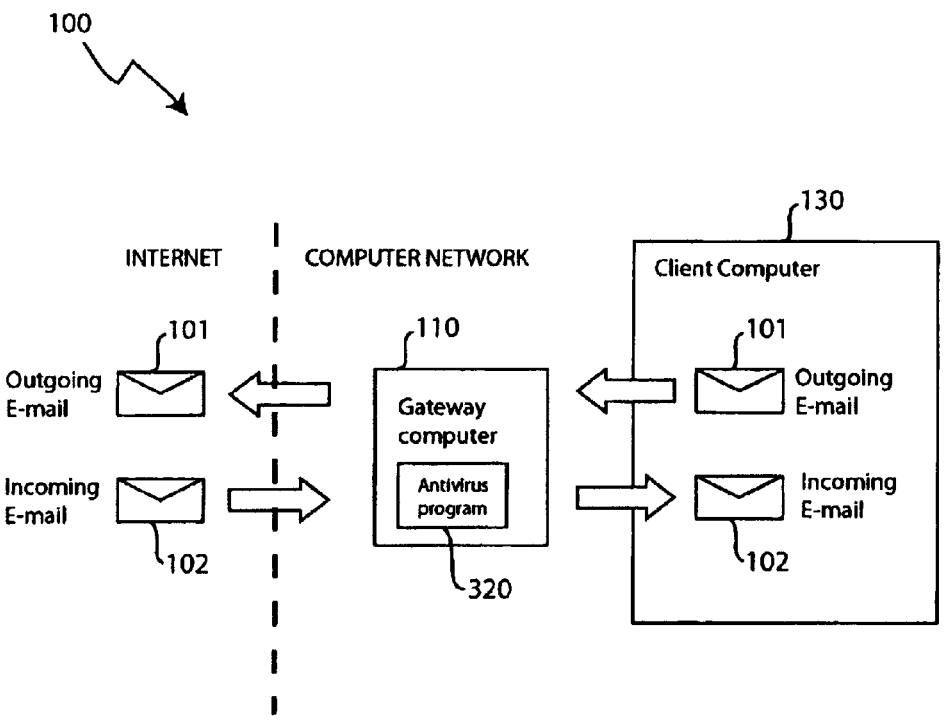

US 7,448,085 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 10, 13 and 16-18 are determined to be patentable as amended.

Claims 2-4, 6-9, 11-12, 14-15 and 19-20, dependent on an amended claim, are determined to be patentable.

New claims 21-35 are added and determined to be patentable.

1. A method to be performed by a server computer, the method comprising:
   receiving a protected archive in the server computer, the protected archive including an archived file, the protected archive *being password protected and* being configured to prevent extraction of the archived file except manually by a user at a client computer; and
   examining *an archive header of* the protected archive for notable characteristics indicative of an archive that has been generated by a malicious program *without opening the protected archive; and*
   *determining that the protected archive contains malicious content without opening the protected archive and without extracting the archived file from the protected archive.*

5. The method of claim 1 wherein the notable characteristics include [the] *a* size of the protected archive.

10. The method of claim 1 wherein examining *the archive header of* the protected archive comprises:
   (a) checking a file size of the protected archive;
   (b) checking for particular values in a header of the protected archive after step (a); and
   (c) checking if the archived file is an executable file after step (b).

13. A computer having a processor for executing computer-readable program code in a memory, the memory comprising:
   computer-readable program code for checking [a] *an archived* file size of a protected archive containing an archived file *without opening the protected archive*, the protected archive being protected by a password;
   computer-readable program code for checking a value in a header of the protected archive *without opening the protected archive*;
   computer-readable program code for determining if the archived file comprises an executable file *without opening the protected archive*; and
   computer-readable program code for determining [if] *that* the protected archive includes a virus based on the file size of the protected archive, the value in the header of the protected archive, and whether the archived file comprises an executable file *without opening the protected archive and without extracting the archived file from the protected archive.*

16. A method to be performed by a computer, the method comprising:
   receiving an e-mail in the computer, the e-mail including a protected archive *that includes an archived file, the protected archive being protected by a password*;
   checking a header of the *protected* archive to determine if the *protected* archive is likely to contain malicious content without extracting [an] *the* archived file in the *protected* archive; *and*
   *determining that the protected archive contains malicious content without opening the protected archive and without extracting the archived file from the protected archive.*

17. The method of claim 16 further comprising:
   checking a file size of the *protected* archive to determine if the *protected* archive is likely to contain malicious content.

18. The method of claim 16 further comprising:
   checking for an executable file in the *protected* archive to determine if the *protected* archive is likely to contain malicious content.

*21. The method of claim 1 wherein the user is able to extract the archived file from the protected archive by entering the password.*

*22. The method of claim 1 wherein the examining the protected archive further comprises:*
   *examining a central directory of the archive header of the protected archive to determine a size of the protected archive; and*
   *comparing the size to that of a known bad archive.*

*23. The method of claim 1 wherein the examining the protected archive further comprises:*
   *examining a central directory of the archive header of the protected archive to determine an archive value;*
   *examining a local file header of the archive header of the protected archive to determine a local file value;*
   *comparing the archive value to that of a first known bad archive; and*
   *comparing the local file value to that of a second known bad archive.*

*24. The method of claim 1 further comprising:*
   *receiving said password along with said protected archive, said password being provided as a graphical image, wherein an antivirus program is prevented from extracting said archived file from said protected archive.*

*25. The method of claim 1 further comprising:*
   *removing said malicious content.*

*26. The computer of claim 13 wherein said archived file is able to be extracted from said protected archive upon receiving said password from a user.*

*27. The computer of claim 13, the memory further comprising:*
   *computer-readable program code for examining a central directory of the header of the protected archive to determine a size of the protected archive; and*
   *computer-readable program code for comparing the size to that of a known bad archive.*

*28. The computer of claim 13 further comprising:*
   *computer-readable program code for receiving said password along with said protected archive, said password* being provided as a graphical image, wherein an antivirus program is prevented from extracting said archived file from said protected archive.

29. The computer of claim 13 further comprising:
computer-readable program code for removing said virus.

30. The method of claim 16 wherein a user is able to extract the archived file from the protected archive by manually entering said password.

31. The method of claim 16 wherein the password is provided in the e-mail in graphical form and is unreadable to a computer program.

32. The method of claim 16 wherein the checking a header further comprises:
examining a central directory of the header of the protected archive to determine a size of the protected archive; and
comparing the size to that of a known bad archive.

33. The method of claim 16 wherein the checking a header of the protected archive further comprises:
examining a central directory of the header to determine an archive value;
examining a local file header of the header to determine a local file value;
comparing the archive value to that of a first known bad archive; and
comparing the local file value to that of a second known bad archive.

34. The method of claim 16 further comprising:
receiving said password along with said protected archive, said password being provided as a graphical image, wherein an antivirus program is prevented from extracting said archived file from said protected archive.

35. The method of claim 16 further comprising:
removing said malicious content.

\* \* \* \* \*